United States Patent
Kuriki et al.

(10) Patent No.: US 9,212,755 B2
(45) Date of Patent: Dec. 15, 2015

(54) FLUID CONTROL DEVICE

(75) Inventors: Haruhiko Kuriki, Osaka (JP); Takahiro Matsuda, Osaka (JP); Mutsunori Koyomogi, Osaka (JP); Megumu Makino, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 234 days.

(21) Appl. No.: 13/569,676

(22) Filed: Aug. 8, 2012

(65) Prior Publication Data

US 2013/0037145 A1 Feb. 14, 2013

(30) Foreign Application Priority Data

Aug. 10, 2011 (JP) .................................. 2011-175042

(51) Int. Cl.
*F16K 11/20* (2006.01)
*F16K 27/00* (2006.01)

(52) U.S. Cl.
CPC ....... *F16K 27/003* (2013.01); *Y10T 137/87249* (2015.04)

(58) Field of Classification Search
CPC ................ F16K 27/003; F16K 27/029; Y10T 137/87249
USPC .................. 137/597, 884, 271, 269
See application file for complete search history.

(56) References Cited

U.S. PATENT DOCUMENTS

| 4,703,913 A | * | 11/1987 | Hunkapiller ................. 251/61.1 |
| 5,983,933 A | * | 11/1999 | Ohmi et al. ................... 137/597 |
| 6,394,138 B1 | * | 5/2002 | Vu et al. ........................ 137/884 |
| 6,615,871 B2 | * | 9/2003 | Morokoshi et al. ........... 137/884 |
| 6,868,867 B2 | * | 3/2005 | Yamaji et al. ................. 137/884 |
| 7,152,629 B2 | * | 12/2006 | Tokuda et al. ................ 137/884 |
| 2006/0096533 A1 | | 5/2006 | Mochizuki et al. |
| 2007/0132231 A1 | | 6/2007 | Tokuda et al. |
| 2007/0295414 A1 | * | 12/2007 | Shinoharo et al. ........ 137/561 A |
| 2009/0250126 A1 | | 10/2009 | Koyomogi |

FOREIGN PATENT DOCUMENTS

| JP | 2004-214622 A | 7/2004 |
| JP | 2007-078006 A | 3/2007 |
| JP | 2007-162734 A | 6/2007 |
| KR | 10-2005-0083707 A | 8/2005 |

OTHER PUBLICATIONS

Notice of Decision to Grant a Patent dated Apr. 29, 2014, issued for the corresponding Korean patent application.

* cited by examiner

*Primary Examiner* — Jessica Cahill
(74) *Attorney, Agent, or Firm* — Locke Lord LLP

(57) ABSTRACT

A fluid control device includes two opening and closing valves 2, 3 disposed symmetrical to each other and having an identical shape, two fluid discharge passages 6, 7, 11, 12 having an equal length and provided in parallel with each other in outlets of the opening and closing valves 2, 3, and a connection member 10 attachable to a chamber and having two fluid passages 25, 26 formed in an equal length to and communicating with the two fluid discharge passages 6, 7, 11, 12, the connection member being provided in outlets of the two fluid discharge passages 6, 7, 11, 12.

4 Claims, 4 Drawing Sheets

FLUID CONTROL DEVICE

BACKGROUND OF THE INVENTION

The present invention relates to a fluid control device used in, for example, a semiconductor manufacturing apparatus, specifically to a fluid control device in which two different types of fluids can be selectively introduced and discharged.

According to the industrial needs, some fluid control devices used in semiconductor manufacturing apparatuses are configured to supply two different types of gases to a treatment chamber. Patent Literature 1 (Japanese Patent Application Laid-Open No. 2004-214622) discloses an example of such a fluid control device in which two different types of fluids can be selectively introduced and discharged. The fluid control device disclosed in Patent Literature 1 has a cylindrical body (head assembly) and two opening and closing valves fitted to the body, wherein the body is attachable to an opening provided in a capping member of a treatment chamber.

The two opening and closing valves of the fluid control device are fitted to the body facing each other in parallel so that the two fluids introduced to the opening and closing valves are swirled around in the body to be mixed with each other and then transmitted to the chamber.

According to the conventional fluid control device, the two fluids (gases) swirled around in the body are often retained. Depending on types of the introduced fluids, a reaction may be generated between the fluids mixed with each other, and a reaction product thereby generated near a discharge port extending from the fluid control device invites the problem that inside of the chamber is contaminated with resulting impurities.

SUMMARY OF THE INVENTION

An object of the present invention is to provide a fluid control device that can avoid the problem that inside of a chamber is contaminated with impurities resulting from a reaction product.

A fluid control device according to the present invention is a fluid control device in which two different types of fluids can be selectively introduced and discharged. The fluid control device includes: two opening and closing valves disposed symmetrical to each other and having an identical shape; two fluid discharge passages having an equal length and provided in parallel with each other in outlets of the opening and closing valves; and a connect ion member attachable to a chamber and having two fluid passages formed in an equal length to and communicating with the fluid discharge passages, the connection member being provided in outlets of the two fluid discharge passages.

According to the fluid control device wherein the two opening and closing valves having an identical shape are disposed symmetrical to each other, the fluid passages from fluid inlets to fluid outlets of the respective opening and closing valves have an equal volume and an equal length, and the two fluid pas sages for the fluids to thereafter travel through also have an equal length. Therefore, the flow control of the two different fluids is facilitated. Further, the fluid control device lets the two different fluids flow through the different fluid discharge passages, thereby avoiding any product produced by the retained and mixed fluids. This eliminates the risk of contamination with impurities resulting from the reaction product, successfully introducing the required fluids into the chamber.

The opening and closing valves are each a three-way valve having two fluid inlet passages and one fluid outlet passage and supported by a first passage block provided with a passage communicating with a first fluid inlet passages, a second passage block provided with a passage communicating with a second fluid inlet passages, and a third passage block provided with a passage communicating with the fluid outlet passage. The respective passage blocks are preferably disposed to be symmetrical on a center line between the two opening and closing valves.

This arrangement facilitates assembling and disassembling of the respective structural elements, providing a good maintainability.

For example, the first passage block is a joint-attached passage block provided with a joint for connection of an introduction tube for introducing the fluid into the first fluid inlet passage, the second passage block is a V-shaped passage block having a passage formed in a roughly V shape (may be a U-like shape), and the third passage block is an I-shaped passage block having a passage formed in an I shape. When fluid discharge tubes vertically extending in parallel with each other are connected to the third passage blocks defined as the I-shaped passage blocks, fluid discharge passages, which include the I-shaped passages of the I-shaped passage blocks and inner passages of the fluid discharge tubes, are formed. The fluid discharge tubes are formed so that the passages thereof respectively extending from the opening and closing valves are in parallel with each other. The fluid discharge tube may have a straight shape or a shape bent at an intermediate position thereof.

Preferably, opening and closing purge valves for selectively introducing and discharging purge fluid to and from the two opening and closing valves are provided in such a manner that the opening and closing valves are interposed therebetween, and outlet passages of the opening and closing purge valves communicate with the passages of the second passage blocks.

When the purge fluid is introduced through the purge valves after the two different fluids (for example, process gasses) are introduced and discharged, the process gases can be easily purged. The fluid control device having these remarkable advantages can be easily assembled and disassembled.

According to the fluid control device of the present invention, the two opening and closing valves having an identical shape are disposed symmetrical to each other, the fluid discharge passages having an equal length are disposed in parallel with each other in outlets of the opening and closing valves, and the connection member attachable to the chamber and having the fluid passages formed in an equal length to and communicating with the fluid discharge passages are provided in the outlets of the two fluid discharge passages. The fluid control device thus structured can easily control the flows of two different fluids, avoid any product produced by the retained and mixed fluids and eliminate the risk of contamination with impurities resulting from the reaction product, successfully introducing the required fluids into the chamber.

DETAILED DESCRIPTION OF PREFERRED EMBODIMENTS

Hereinafter, preferred embodiments of the present invention are described with reference to the drawings. All of expressions indicating directions in the description hereinafter given, upper, lower, right, and left, are upper, lower, right, and left directions illustrated in FIG. 1.

Figure 1:
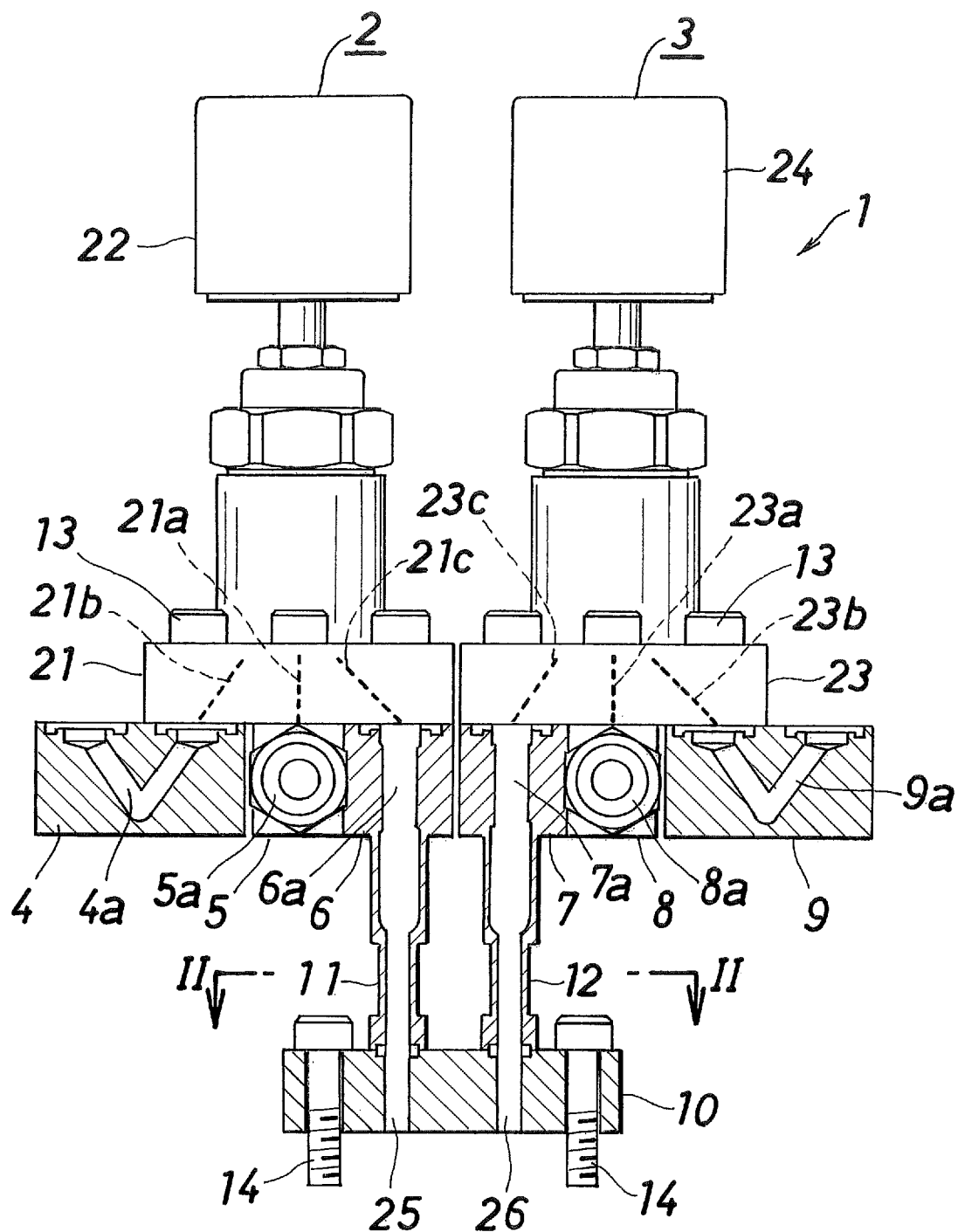
FIG. 1 is a front sectional view of a first preferred embodiment of a fluid control device according to the present invention.

A first preferred embodiment of a fluid control device 1 according to the present invention is configured to introduce and discharge two different types of fluids selectively to and from a chamber (not illustrated in the figures). As illustrated in FIG. 1, the fluid control device includes: left and right opening and closing valves 2 and 3 having an identical shape and provided in an upper stage of the device; six cuboidal passage blocks 4, 5, 6, 7, 8, and 9 provided side by side in a lower stage of the device to support the opening and closing valve 2 and 3; a connection member 10 provided below the six passage blocks 4, 5, 6, 7, 8, and 9 and attached to the chamber; and fluid discharge tubes 11 and 12 extending downward and having upper ends fixated to the two passage blocks 6 and 7 at the center. The fluid control device 1 has a bilaterally symmetrical shape on a center line between the two opening and closing valves 2 and 3 disposed side by side.

The opening and closing valves 2 and 3 are both three-way valves respectively including bodies 21 and 23 having fluid passages 21a, 23a, 21b, 23b, 21c, and 23c, and actuators 22 and 24 provided to block and release the fluid passages 21a, 23a, 21b, 23b, 21c, and 23c. The fluid passages 21a, 23a, 21b, 23b, 21c, and 23c of the bodies 21 and 23 are respectively defined as; first fluid inlet passages 21a and 23a used as process gas inlet passages, second fluid inlet passages 21b and 23b used as purge gas inlet passages, and outlet passages 21c and 23c used as outlet passages for process and purge gases both.

The opening and closing valves 2 and 3 are respectively fitted to the passage blocks 4, 5, 6, 7, 8, and 9 in a detachable manner by means of hexagon socket head bolts 13 fastened therein from an upper direction.

The passage blocks 4, 5, 6, 7, 8, and 9 include left and right V-shaped passage blocks (second passage blocks) 4 and 9 respectively having V-shaped passages 4a and 9a and provided on left and right ends, left and right joint-attached passage blocks (first passage blocks) 5 and 8 having joints 5a and 8a for connection of an introduction tube for introducing fluids into the first fluid inlet passages 21a and 23a and provided on inner sides of the left and right V-shaped passage blocks 4 and 9, and left and right I-shaped passage blocks (third passage blocks) 6 and 7 having I-shaped passages 6a and 7a and provided on inner sides of the left and right joint-attached passage blocks 5 and 8. Though not illustrated in the figures, passages formed in an L-shape when viewed from a lateral direction are formed in the joint-attached passage blocks 5 and 8.

The first fluid inlet passages 21a and 23a of the opening and closing valves 2 and 3 communicate with the joint-attached passage blocks 5 and 8, the second fluid inlet passages 21b and 23b of the opening and closing valves 2 and 3 communicate with the V-shaped passages 4a and 9a of the V-shaped passage blocks 4 and 9, and the outlet passages 21c and 23c of the opening and closing valves 2 and 3 communicate with the I-shaped passages 6a and 7a of the I-shaped passage blocks 6 and 7.

The left V-shaped passage block 4 supports the left opening and closing valve 2 using a right-half portion (inner half portion) thereof, while the right V-shaped passage block 9 supports the right opening and closing valve 3 using a left-half portion (inner half portion) thereof. In outer half portions of the V-shaped passage blocks 4 and 9, the V-shaped passages 4a and 9a are opening upward to allow another fluid (process gas or purge gas) to be introduced into the V-shaped passage blocks 4 and 9.

The I-shaped passages 6a and 7a of the left and right I-shaped passage blocks 6 and 7 are vertically extending in parallel with each other. The fluid discharge tubes 11 and 12 are continuous to the I-shaped passages 6a and 7a of the I-shaped passage blocks 6 and 7 and vertically extending in parallel with each other. When the fluid discharge tubes 11 and 12 are coupled with the I-shaped passage blocks 6 and 7, fluid discharge passages respectively including the I-shaped passages 6a and 7a of the I-shaped passage blocks 6 and 7 and inner passages of the fluid discharge tubes 11 and 12 are formed. The passage blocks 4, 5, and 6 disposed on the left side are respectively formed in shapes identical to shapes of the passage blocks 9, 8, and 7 disposed on the right side. The left fluid discharge tube 11 and the right fluid discharge tube 12 are formed in an identical shape. Accordingly, the fluid discharge passages on left and right respectively including the I-shaped passages 6a and 7a and inner passages of the fluid discharge tubes 11 and 12 are formed in an equal length.

The fluid discharge tubes 11 and 12 are not necessarily formed in a straight shape but may be formed in a shape bent at an intermediate position thereof as far as the passages from the opening and closing valves 2 and 3 (I-shaped passages 6a and 7a and inner passages of the fluid discharge tubes 11 and 12 are respectively in parallel with each other.

Figure 2:
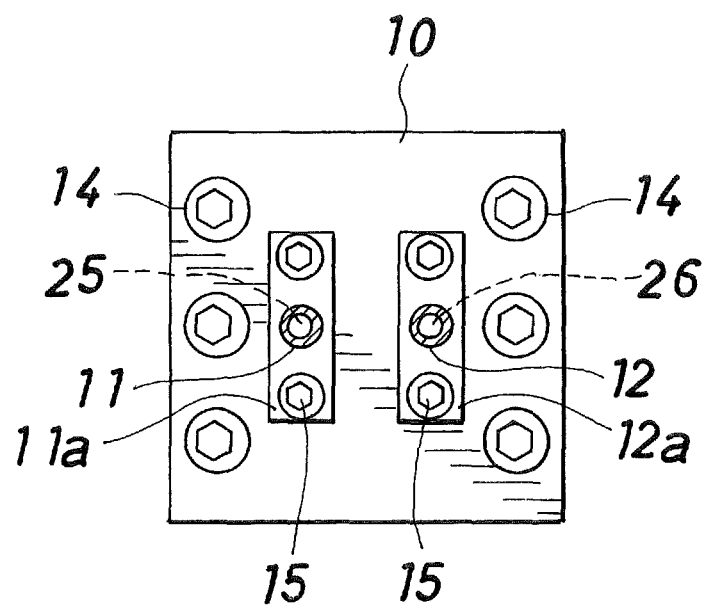
FIG. 2 is a sectional view taken along line II-II in FIG. 1.

As illustrated in FIG. 2, the connection member 10 is formed in a cuboidal shape having a square bottom shape. The connection member 10 has left and right fluid passages 25 and 26 communicating with the fluid discharge tubes 11 and 12 and extending vertically in an equal length. The connection member 10 is fitted to the chamber by means of hexagon socket head bolts 14. To fixate the fluid discharge tubes 11 and 12 to the connection member 10, flange portions 11a and 12a provided in the fluid discharge tubes 11 and 12 are fitted to the connection member 10 by means of hexagon socket head bolts 15 as illustrated in FIG. 2. The bottom shape of the connection member 10 is not limited to square but may be any other shape, rectangular or polygonal, as far as the fluid discharge tubes 11 and 12 are connectable to the chamber.

As described so far, the fluid control device 1 according to the preferred embodiment has a bilaterally symmetrical shape on the center line between the two opening and closing valves 2 and 3 disposed side by side. According to the structure, the fluid passages from the inlets to the outlets of the respective opening and closing valves 2 and 3 have an equal volume and an equal length, as a result of which the left and right fluid passages have an equal conductance. When two different types of fluids (for example, two different types of gases) are supplied to the chamber, the two different gases are equally introduced and discharged without any time delay as far as preconditions, such as pressure, are coordinated between the two valves and the opening and closing valves 2 and 3 are then opened at exactly the same time. Thus, the flow control of two different fluids is facilitated.

Figure 4:
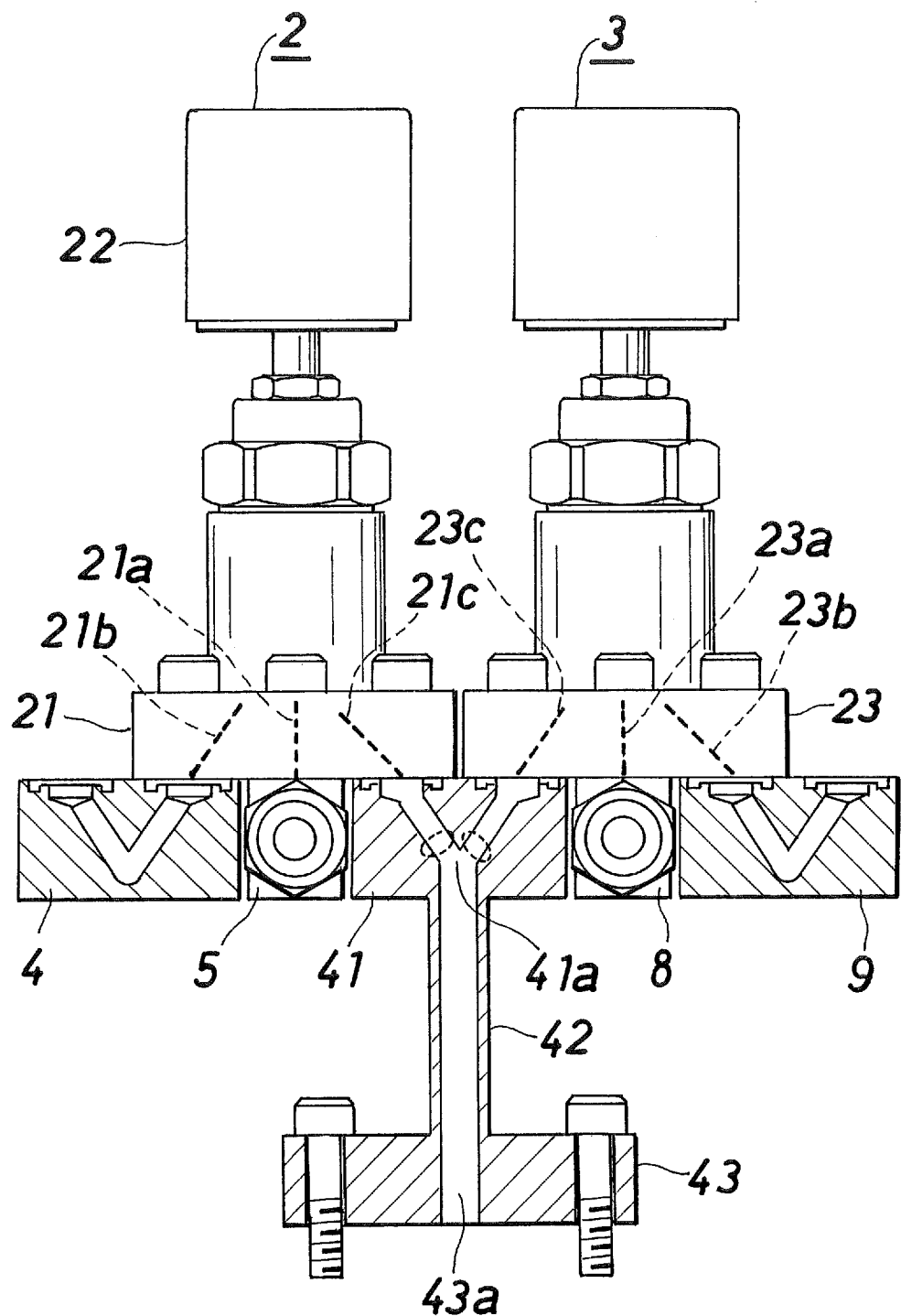
FIG. 4 is a front view of a comparative example of the fluid control device according to the present invention.

FIG. 4 illustrates a fluid control device according to a comparative example. The fluid control device has a Y-shaped passage block 41, which is a center passage block 41 having a Y-shaped passage 41a, in place of the left and right I-shapes passage blocks 6 and 7, wherein two different fluids are mixed with each other in the Y-shaped passage 41a of Y-shaped passage block 41. A discharge tube 42 has a passage formed to send the fluids mixed in the Y-shaped passage 41a downward, and a connection member 43 has a fluid passage 43a communicating with a discharge tube 42. Any structural features of the liquid fluid device but the center passage block 41, discharge tube 42, and connection member 43 are identical to those described in the first preferred embodiment illustrated in FIG. 1. The fluid control device similarly has a bilaterally symmetrical shape.

The fluid control device according to the comparative example has a bilaterally symmetrical shape on a center line between the two opening and closing valves 2 and 3 disposed side by side. According to the structure, the fluid passages from the inlets to the outlets of the respective opening and closing valves 2 and 3 have an equal volume and an equal length, as a result of which the left and right fluid passages have an equal conductance. Therefore, the flow control of two different fluids is facilitated similarly to the first preferred embodiment. In the fluid control device according to the comparative example, however, the fluids may be retained in sections illustrated with broken lines in the Y-shaped passage 41a of the Y-shaped passage block 41. In the case where the fluids retained there are gases having reactivity therebetween, the gases, when mixed with each other, generate a reaction product.

According to the fluid control device 1 of the first preferred embodiment, on the other hand, the two different fluids are separately transported through the different fluid discharge tubes 11 and 12 and the different fluid passages 25 and 26 formed in the connection member, thereby avoiding any product produced by the retained and mixed fluids. This eliminates the risk of contamination with impurities resulting from a reaction product, successfully introducing the required fluids into the chamber.

Figure 3:
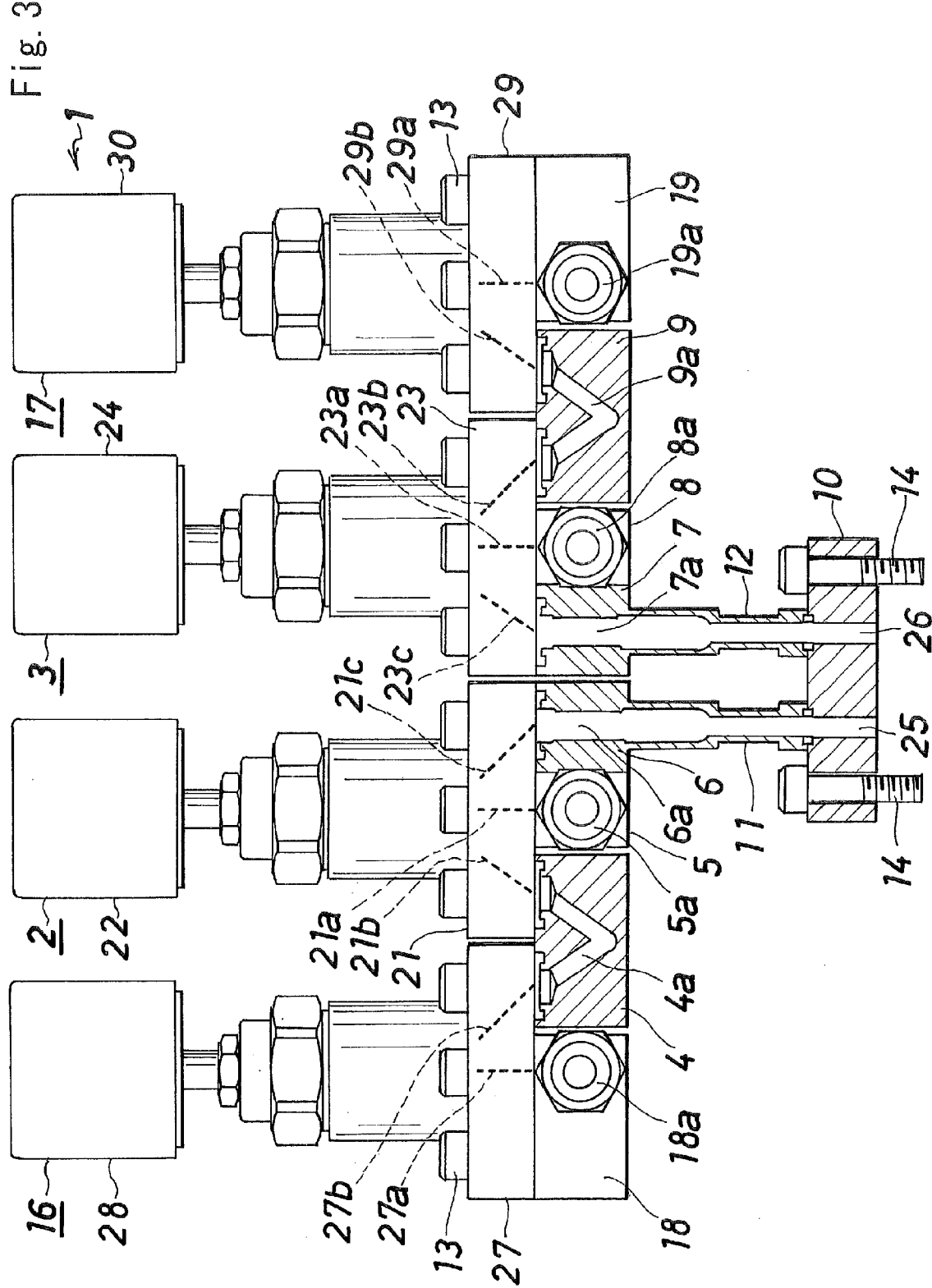
FIG. 3 is a front view of a second preferred embodiment of the fluid control device according to the present invention.

The fluid control device 1 illustrated in FIG. 1 has the main structural elements according to the present invention. Preferably, left and right opening and closing purge valves 16 and 17 for selectively introducing and discharging purge fluid to and from the two opening and closing valves 2 and 3 for process gas are provided in such a manner that the opening and closing valves 2 and 3 are interposed therebetween as illustrated in FIG. 3. In the description given below, the same structural elements as those of the first preferred embodiment are not described again with the same reference symbols simply appended thereto.

The opening and closing purge valves 16 and 17 respectively include bodies 27 and 29 having fluid passages, and actuators 28 and 30 provided to block and release the fluid passages. Respective inner half portions of the bodies 27 and 29 of the opening and closing purge valves 16 and 17 are supported by outer half portions of the V-shaped passage blocks 4 and 9 supporting the opening and closing valves 2 and 3 for process gas. Accordingly, outlet passages 27b and 29b of the opening and closing purge valves 16 and 17 communicate with V-shaped passages 4a and 9a of the V-shaped passage blocks 4 and 9.

Respective outer half portions of the bodies 27 and 29 of the opening and closing purge valves 16 and 17 are supported by left and right joint-attached passage blocks 18 and 19 provided with joints 18a and 19a. Though not illustrated in the figures, the joint-attached passage blocks 18 and 19 respectively have passages formed in an L shape when viewed from a lateral direction, and these passages communicate with inlet passages 27a and 29a of the opening and closing purge valves 16 and 17.

The opening and closing purge valves 16 and 17 are detachably fitted respectively to the passage blocks 4, 9, 18, and 19 by means of hexagon socket head bolts 13 fastened therein from an upper direction.

According to the fluid control device 1 of the second preferred embodiment, the process gases can be easily purged by supplying the purge fluid through the purge valves after the two different fluids (for example, process gasses) are introduced and discharged.

According to the fluid control devices 1 of the first and second preferred embodiments, the opening and closing valves 2, 3, 16, and 17 are detachably fitted respectively to the passage blocks 4, 5, 6, 7, 8, 9, 18, and 19 by means of the hexagon socket head bolts 13. This arrangement facilitates assembling and disassembling of the respective structural elements, and since the opening and closing valves 2, 3, 16, and 17 are easily detached, a good maintainability is provided.

What is claimed is:

1. A fluid control device wherein two different types of fluids can be selectively introduced and discharged, the device comprising:
    two opening and closing valves disposed symmetrical to each other and having an identical shape;
    two fluid discharge passages having an equal length and provided in parallel with each other in outlets of the respective opening and closing valves; and
    one, single connection member for the two opening and closing valves, the one connection member attachable to a chamber and having only two fluid passages formed in an equal length, the one connection member being provided in outlets of the two fluid discharge passages,
    wherein one end of each fluid passage of the one connection member communicates with the outlet of the each fluid discharge passage and another end of each of the two fluid passages of the one connection member is configured to communicate with an inlet passage provided at the chamber without any intermediate member.

2. The fluid control device according to claim 1, wherein
    the two opening and closing valves are each a three-way valve having two fluid inlet passages and one fluid outlet passage, the three-way valves being supported by first passage blocks provided with passages communicating with a first fluid inlet passages, second passage blocks provided with passages communicating with a second fluid inlet passages, and third passage blocks provided with passages communicating with the fluid outlet passages, and
    the respective passage blocks are disposed to be symmetrical on a center line between the two opening and closing valves.

3. The fluid control device according to claim 2, wherein
    the first passage blocks are joint-attached passage blocks provided with joints for connection of an introduction tube for introducing the fluids into the first fluid inlet passages, the second passage blocks are V-shaped passage blocks having the passages formed in a V shape, and the third passage blocks are I-shaped passage blocks having the passages formed in an I shape, and
    two fluid discharge tubes disposed in parallel with each other are connected to the third passage blocks so that each fluid discharge passage including the I-shaped passage of the third passage block and inner passage of the fluid discharge tube is formed.

4. The fluid control device according to claim 2, wherein
opening and closing purge valves for selectively introducing and discharging purge fluid to and from the two opening and closing valves are provided in such a manner that the opening and closing valves are interposed therebetween, and
outlet passages of the opening and closing purge valves communicate with the passages of the second passage blocks.

\* \* \* \* \*